US012719696B2

(12) United States Patent
Peddada et al.

(10) Patent No.: US 12,719,696 B2
(45) **Date of Patent: *Aug. 25, 2026**

(54) SECRET PROTECTION DURING SOFTWARE DEVELOPMENT LIFE CYCLE

(71) Applicant: Salesforce, Inc., San Francisco, CA (US)

(72) Inventors: Prasad Peddada, Alameda, CA (US); Matthew Schechtman, Fairfax, VA (US); Taher Elgamal, Atherton, CA (US)

(73) Assignee: Salesforce, Inc., San Francisco, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 18/639,481

(22) Filed: Apr. 18, 2024

(65) Prior Publication Data

US 2025/0373439 A1 Dec. 4, 2025

Related U.S. Application Data

(63) Continuation of application No. 17/649,513, filed on Jan. 31, 2022, now Pat. No. 11,997,215.

(51) Int. Cl.

| | |
|---|---|
| ***G06F 21/60*** | (2013.01) |
| ***H04L 9/08*** | (2006.01) |
| ***H04L 9/32*** | (2006.01) |

(52) U.S. Cl.

CPC .......... *H04L 9/3247* (2013.01); *G06F 21/602* (2013.01); *H04L 9/0894* (2013.01)

(58) Field of Classification Search

CPC .... H04L 9/3247; H04L 9/0894; G06F 21/602

See application file for complete search history.

(56) References Cited

U.S. PATENT DOCUMENTS

| | | | | |
|---|---|---|---|---|
| 11,838,296 | B1 * | 12/2023 | Rossman | H04L 63/20 |
| 2014/0181517 | A1 * | 6/2014 | Alaranta | H04L 63/062 713/168 |

(Continued)

OTHER PUBLICATIONS

10 Best Secret Management Software for Application Security, by Geekflare Editorial, https://geekflare.com/secret-management-software/, Aug. 20, 2021, 26 pages.

(Continued)

*Primary Examiner* — Hee Soo Kim

(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to the protection of secrets within a software development lifecycle. Developers can use an encryption service to encrypt a secret to be used by an application within a package. The secret can be associated with the application, and then encrypted and included in a package that is signed and passed through a software automation pipeline to a data center that hosts the production server for the application. The application executing on the production server can request that the secret be decrypted by a decryption service after package verification. A developer can also specify, in a manifest file, a set of secrets needed for applications executing in the same data center. The manifest file may be passed from the software development environment to the data center, where the specified secrets are created and used by the applications without ever residing or being accessible outside the data center.

20 Claims, 13 Drawing Sheets

(56) References Cited

U.S. PATENT DOCUMENTS

| | | | | |
|---|---|---|---|---|
| 2019/0146816 | A1* | 5/2019 | Reno | G06F 21/10<br>718/1 |
| 2019/0303349 | A1* | 10/2019 | Burshteyn | H04L 9/0891 |
| 2019/0394042 | A1* | 12/2019 | Peddada | H04L 9/0894 |
| 2020/0244455 | A1* | 7/2020 | Teitzel | G06N 20/00 |
| 2021/0006402 | A1* | 1/2021 | Ohms | H04L 9/0643 |
| 2022/0094539 | A1* | 3/2022 | Teitzel | H04L 9/0897 |
| 2023/0037986 | A1* | 2/2023 | Li | G06F 21/78 |

OTHER PUBLICATIONS

Hacker got access to internal Comodo files via leaked password, Techzine Europe, https://www.techzine.eu/news/cloud/41701/hacker-got-access-to-internal-comodo-files-via-leaked-password/, Jul. 29, 2019, 4 pages.

Over 100,000 GitHub repos have leaked API or cryptographic keys, Catalin Cimpanu, ZDnet, Zero Day, https://www.zdnet.com/article/over-100000-github-repos-have-leaked-api-or-cryptographic-keys/#:~:text=A%20scan%20of%20billions%20of,secrets%20on%20a%20daily%20basis, Mar. 21, 2019, 44 pages.

Over two million corporate secrets detected on public GitHub in 2020, Security Magazine, BNP Media, https://www.securitymagazine.com/articles/94776-over-two-million-corporate-secrets-detected-on-public-github-in-2020, Mar. 9, 2021, 5 pages.

Secrets Management, CyberArk, https://www.cyberark.com/what-is/secrets-management/, 4 pages.

How to Scan GitHub Repositories for Secrets & Credentials with Open Source, Swaathi Kakarla, CyberArk Conjur, https://www.conjur.org/blog/how-to-scan-github-repositories-for-secrets-credentials-with-open-source/, Apr. 9, 2020, 7 pages.

* cited by examiner

540 receiving, at a software automation pipeline implemented by one or more computer systems within the software development environment, code for the application and one or more packages that include encrypted versions of the secrets

545 outputting, by the software automation pipeline to a data center that includes a production server for executing the application, a production version of the application and the one or more packages,
where the data center is configured to implement a decryption service that decrypts the one or more packages such that unencrypted versions of the secrets are accessible by the production version of the application, but are inaccessible outside the data center.

550

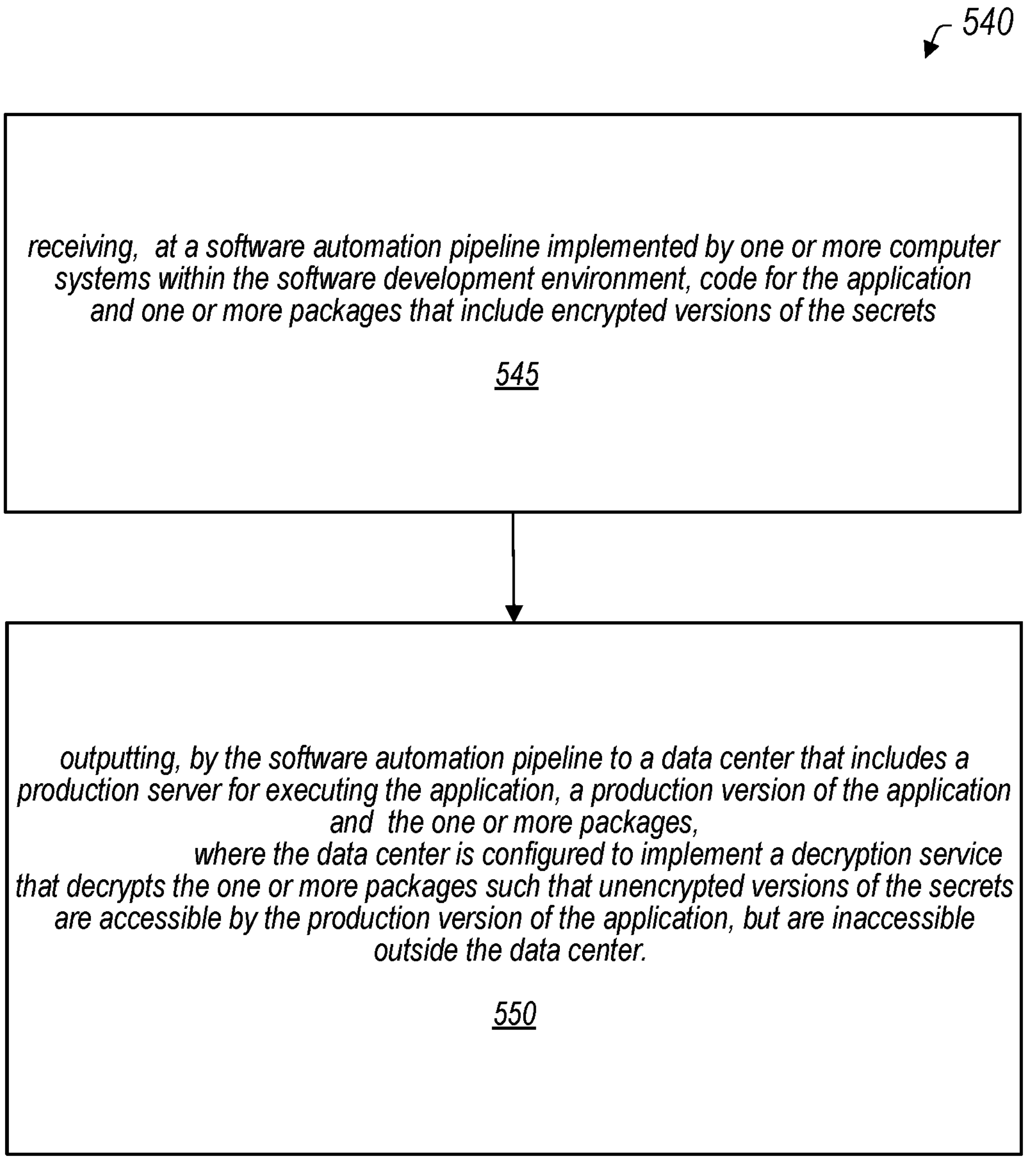

FIG. 5B storing, at a storage location in a data center, a signed package that includes an encrypted version of a secret referenced by a first application, where the encrypted version of the secret has been encrypted by an encryption service using a symmetric key that has been generated using a data center public key of a data center key pair of the data center, and wherein the signed package includes information indicating that the secret is associated with the first application

564 sending, by the first application executing on a production server within the data center, a request for a decrypted version of the secret to a decryption service executing within the data center

568 the decryption service verifying the signed package

572 the decryption service deriving the symmetric key using a data center private key of the data center key pair in response to the signed package being verified

576 the decryption service decrypting the encrypted version of the secret using the symmetric key

580 the decryption service returning the decrypted version of the secret to the first application

584

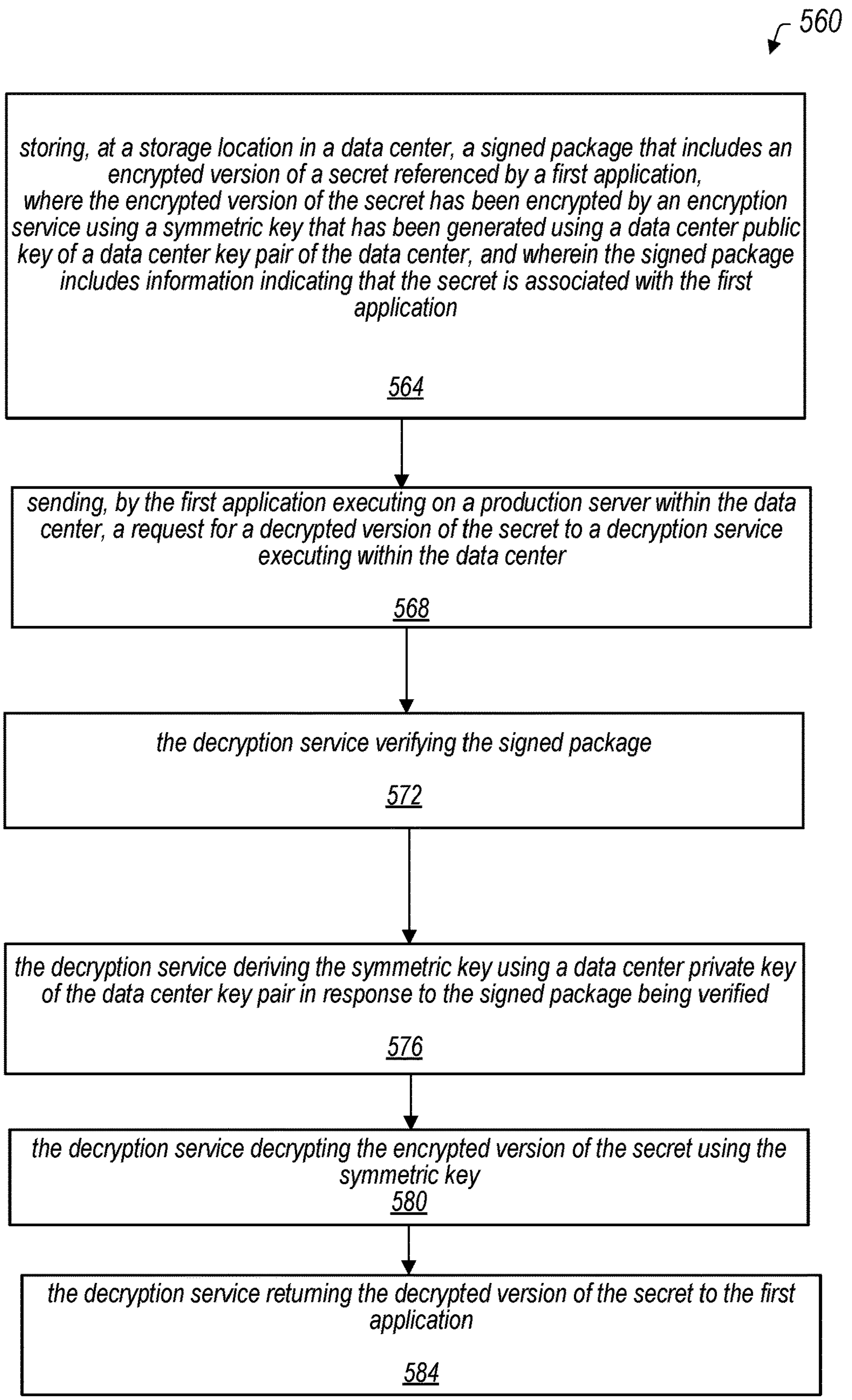

FIG. 5C

800 receiving, at a software automation pipeline implemented by one or more computer systems within a software development environment, source code for a first application and a manifest file that specifies secrets to be created and used by the first application

810 outputting, by the software automation pipeline to a data center that includes one or more production servers for the first and second applications, a production version of the first application and the manifest file,
where the data center is configured to create the secrets specified by the manifest file such that the secrets are accessible by the production version of the first application within the data center, but are inaccessible outside the data center

820

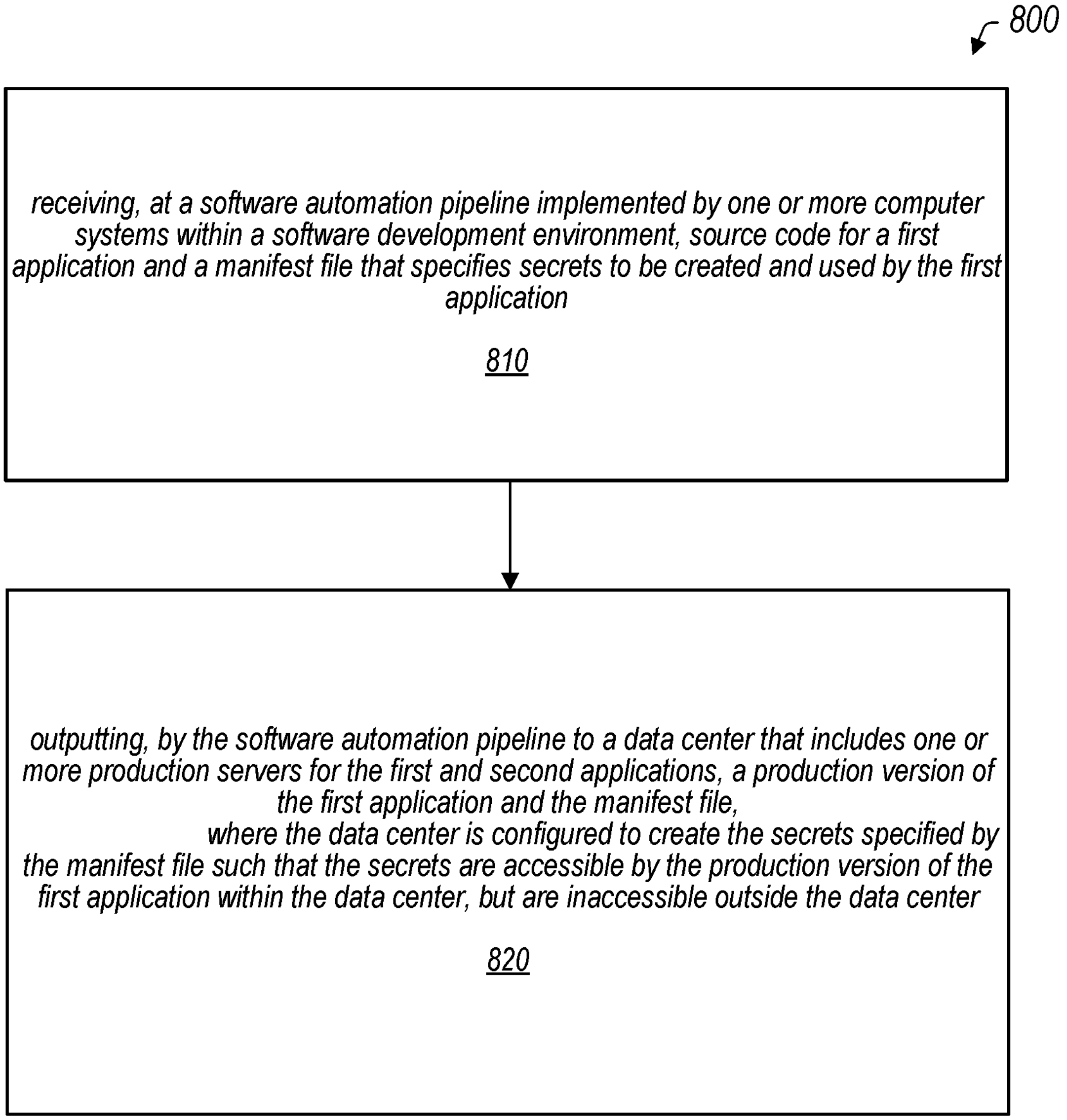

FIG. 8A

SECRET PROTECTION DURING SOFTWARE DEVELOPMENT LIFE CYCLE

PRIORITY CLAIM

The present application is a continuation of U.S. application Ser. No. 17/649,513, entitled "Secret Protection During Software Development Life Cycle," filed Jan. 31, 2022, the disclosure of which is incorporated by reference herein in its entirety.

BACKGROUND

Technical Field

This disclosure relates generally to software development environments and, more specifically, to protection of secrets for software programs within such environments.

Description of the Related Art

Software development, particularly for enterprise software, can be a complex undertaking, frequently involving dozens or even hundreds of developers. The ecosystem within which this development takes place can be referred to as a software development environment. One common component of a software development environment is a code repository, which allows for collaboration and software version control. Storing code to a code repository may also trigger a pipeline, sometimes referred to as a "CI/CD pipeline," which automatically handles various tasks such as integration, testing, delivery and deployment of software in a way that shortens development time.

Software applications frequently rely on "secrets" to access other tools, applications, and data. As used herein, the term "secret" refers to a private piece of information that allows access to protected resources or sensitive information. Examples of secrets include account credentials, passwords, SSH keys, API keys, symmetric and asymmetric cryptographic keys, etc. For example, a SALESFORCE application might use a secret to authenticate to a third-party computer system (e.g., a server for GOOGLE MAPS) in order to exchange data with that system.

An entity with access to a secret can gain access and permission to any resources belonging to the owner of the secret. Malicious actors understand this and frequently target secrets to gain authorized access to sensitive information, which may include additional secrets. Accordingly, a cyber-attack targeting secrets can spread far beyond the scope of the initial breach.

To address these security concerns, secrets are sometimes stored in a secret repository known as a vault. A vault is a computer platform that allows developers to secure, store, and control access to secrets. In addition to preventing unauthorized users from gaining access, the vault also provides centralized control, more productivity, and legal compliance.

BRIEF DESCRIPTION OF THE DRAWINGS

FIG. 5A-C are flow diagrams relating to the handling of encrypted secrets within a software development environment.

FIGS. 8A-B are flow diagrams relating to the use of a manifest file within a software development environment.

DETAILED DESCRIPTION

Figure 1:
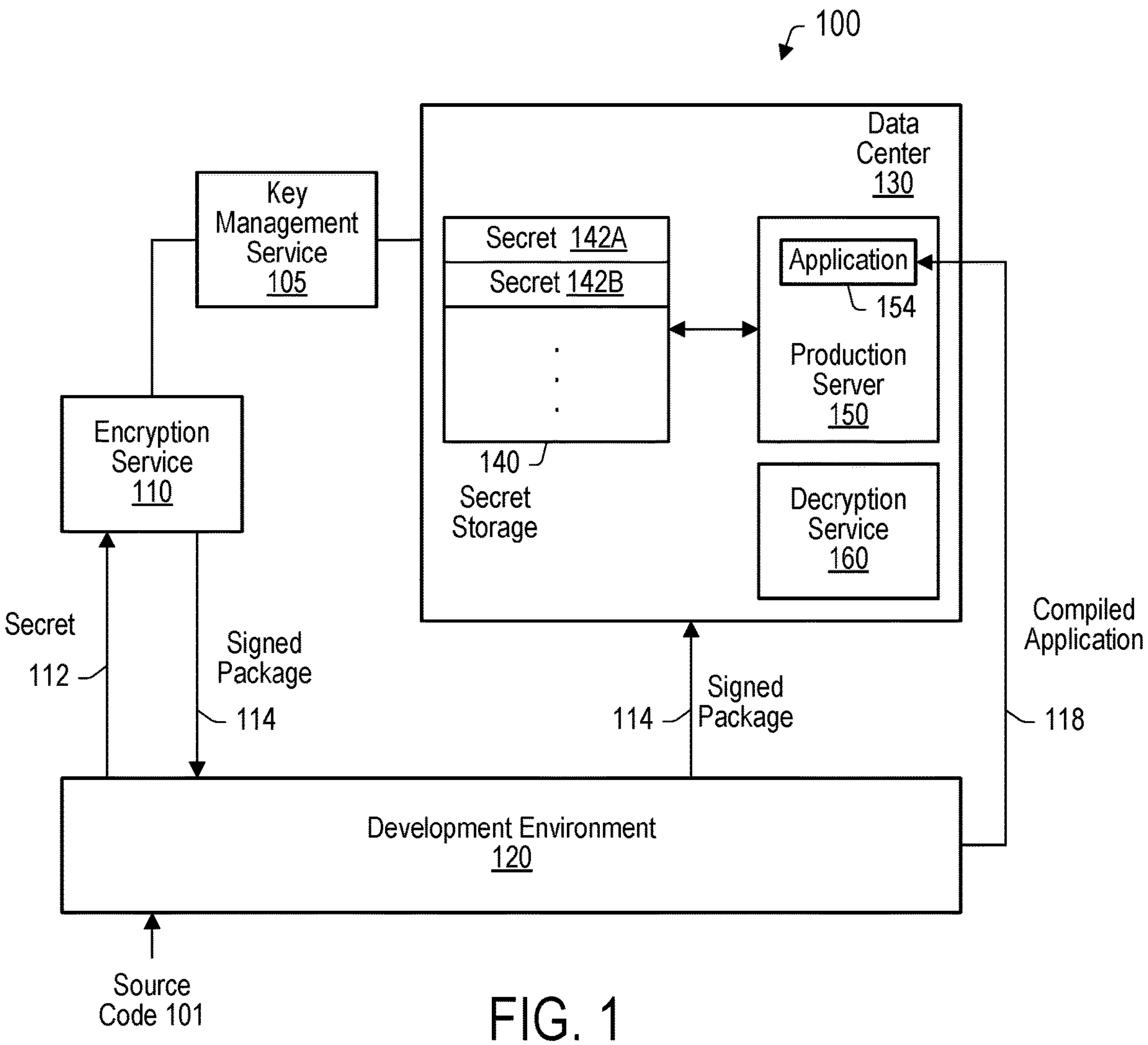
FIG. 1 is a block diagram of one embodiment of a software development environment in which secrets are encrypted and supplied to a software automation pipeline and then to a data center.

Although some measures are currently being taken to protect secrets within software development environments, security issues still remain. Unfortunately, secrets can be compromised before they reach a secret repository. For example, developers sometimes inadvertently upload secrets to a publicly accessible code repository, meaning that these secrets can be scraped and exploited by a malicious actor.

One problem that can lead to secret mismanagement is the size of some software development teams. When hundreds of developers are working on a project, this increases the chances that someone mishandles a sensitive piece of information, whether intentionally or unintentionally. The inventors have recognized that it is undesirable to have secrets handled in unencrypted form in the manner that is common in today's software development lifecycle.

Still further, the inventors have recognized that even secret management software such as the HASHICORP VAULT has limitations. For example, if a software development company wishes to deploy secrets to a secret repository in a production center, this requires that the entity deploying the secrets has direct access to the vault, which can create issues from a security perspective. Additionally, there can be a downside to having all secrets reside in one central location, for if a vault is breached, all secrets in the organization are in jeopardy. In contrast, the present disclosure describes a paradigm in which secrets are distributed in a decentralized manner—for example, secrets can be stored in memory along with the code for the particular applications with which they are associated. This means that there is no single target of opportunity for a malicious actor.

The present disclosure sets forth several techniques to improve secret security. An encryption service may be used to encrypt a secret in a package that is signed by a private key that is backed by a key management service (KMS). The signed package may include metadata indicating that the secret is associated with a particular application. (As will be discussed below, subsequent secret decryption may be permitted only when the software entity requesting decryption has previously been identified in the secret metadata. The signed secret package may be passed through a software automation pipeline and received by a data center. When a production version of the particular application is executing, it can request that the secret be decrypted by a decryption service. The decryption service can verify the signed secret package, which may involve both verifying a signature of the package to check for tampering, and checking that an entity that is requesting decryption (the "requesting entity," here the particular application) matches an entity specified in the metadata of the package (the "indicated entity"). Upon package verification, the decryption service decrypts the encrypted version of the secret in the package, and returns it to the particular application. Such embodiments are described with respect to FIGS. 1-4 and 5A-C.

Additionally or in the alternative, secrets used by a single application or by applications executing in the same data center may actually be generated within the data center. In such embodiments, secret parameters for a particular application can be specified in a manifest file that may travel through the automation pipeline with the application. The manifest file may ultimately be passed to the production data center, where the secrets may be created and used, without ever being accessible outside the data center. These embodiments are described with respect to FIGS. 6-7 and 8A-B. In short, the embodiments of the present disclosure either limit access to unencrypted versions of secrets or ensure that secrets are accessible only within the data center, thereby decreasing the likelihood that secrets will be compromised. Still further, the embodiments of the present disclosure have no notion of a human administrator for the encryption and decryption services. This paradigm leads to less operational overhead and fewer humans with access to secrets. This approach also decouples secret delivery/storage from secret security. In other words, under the paradigm of the present disclosure, there is no one path that must be followed in a software life cycle in which code goes from development to production. Whatever path is followed, secrets will be encrypted and signed, and therefore protected. In other words, the method of secret delivery to production is orthogonal to the solutions described herein for secret protection.

FIG. 1 is a block diagram of one embodiment of a computer system for developing software that utilizes secrets. As shown, system 100 includes development environment 120, encryption service 110, key management service (KMS) 105, and data center 130. Data center 130 includes secret storage 140 for secrets 142, decryption service 160, and production server 150, on which applications such as application 154 executes. In the depicted embodiment, application 154, during execution, uses secrets 142A-B.

Development environment 120 represents the resources used to generate various versions of applications such as application 154. Environment 120 may include the computers of various developers (which may produce source code 101), as well as computer systems implementing software development tools and platforms, some of which may be located on remote systems. For example, environment 120 might include a code repository such as GitHub, as well as various software tools and platforms such as Jenkins, Spinnaker, etc. The tools may be arranged to form a software automation pipeline (e.g., a CI/CD pipeline) that automates various software development tasks, including outputting compiled application 118 to data center 130 as application 154.

A developer within environment 120 may, after creating a secret 112, pass secret 112 to encryption service 110. (As will be discussed, in some embodiments, secret 112 may be specified by a developer and actually created within encryption service 110.) Encryption service 110 encrypts secret 112 into a package 114. Secret 112 may be encrypted using a symmetric key that is generated using a key agreement protocol. For example, the symmetric key can be generated using a public key of a data center key pair whose data center private key is accessible by the data center. This data center key pair may be stored by KMS 105, for example (or within some other repository). The key agreement protocol may also utilize an ephemeral private key of an ephemeral key pair generated specifically for that secret by encryption service 110 in order to generate the symmetric key. The package with the encrypted version of secret 112 can then be signed (e.g., with a signing private key of encryption service 110, the signing private key backed by KMS 105) to produce signed package 114. Signed package 114 may also include additional information, such as the ephemeral public key of the ephemeral key pair and metadata identifying an application allowed to request subsequent decryption of the secret.

Note that references in this disclosure to a "key agreement protocol" also include the use of a key agreement protocol followed by a key derivation function (KDF) such as HKDF, in which the secret for KDF is the output of the key agreement.

Signed package 114 may then be provided to an automation pipeline in which various automated actions may be performed relating to software development (e.g., build, test, deployment). The automation pipeline can then provide signed package 114 directly to data center 130, where secret 112 can be stored in secret storage as secret 142. Secret storage 140 broadly refers to any possible type of memory, including, without limitation, a secret repository such as a vault, memory in the file system of data center 130, S3 storage, a relational database, etc. In some embodiments, secret storage for a particular application may be stored along with or in proximity to the compiled code for the application.

Decryption service 160 executes to ensure that applications such as application 154 have access to unencrypted versions of secrets. When a particular secret 142 is needed during execution of application 154, decryption service 160 can either retrieve or be provided secret 142 as an array of bits from storage 140. Decryption service 160 is executable to verify the package's signature using the public key corresponding to the private key originally used for signing (i.e., the signing private keys of encryption service 110). This package may also be verified by checking that the entity requesting decryption matches an entity specified in metadata within package 114. For example, a package may include information indicating that a particular secret is associated with a CRM application. Decryption service 160 can then check the certificate presented by the entity requesting the decryption to determine if the identity of the requesting entity matches the application indicated within package metadata. Any decryption requests for which the verification indicates tampering or a non-conforming requesting entity may be denied.

Once a package 114 is verified, decryption service 160 derives the symmetric key that was originally used to encrypt secret 112. In one embodiment, this operation is performed using 1) the ephemeral public key (included in package 114) and 2) the data center private key of the data center key pair whose data center public key was used to generate the symmetric key (accessible within data center 130). Decryption service 160 then decrypts secret 112 using the derived symmetric key, and returns the result to the requesting entity.

In addition to limiting access to secrets within data center 130, the paradigm shown in FIG. 1 also desirably produces "end-to-end" encryption of secrets that minimizes the exposure of unencrypted secrets within software development environment 120. Once a developer has secured secret 112 using encryption service 110, that secret passes through the software development environment 120 in encrypted form until it reaches data center 130, where it remains encrypted until actually used during execution.

Still further, the inventors also propose the use of a manifest file in some embodiments. Secrets may be used by a single application or by applications that execute within the same data center. For example, in one setting, a secret may need to be shared with all tenants of a multi-tenant database within a single application. As another example, a database and a data base management host may need to share credentials, as one is authenticating with the other.

In such cases, rather than a developer generating a secret (or the secret being generated by encryption service 110), a developer can specify a set of secrets that need to be generated for a single application, or applications executing in the same data center. This specification may include a set of criteria for secret generation (e.g., secret length). This manifest file may pass through software development environment 120 to data center 130. Software within the data center may then generate and store the secrets, where they can then be encrypted and decrypted in the same manner as described above for secrets created outside data center 130. In this manner, secrets never leave data center 130 and can only be accessed by servers or applications executing on production server 150 upon a request for a particular secret (e.g., when a first application needs to access the particular secret to authenticate to a second application executing within the same data center, or when needed by a single application).

These techniques afford greater security for secrets, which in turn provides greater security for the associated application.

Figure 2:
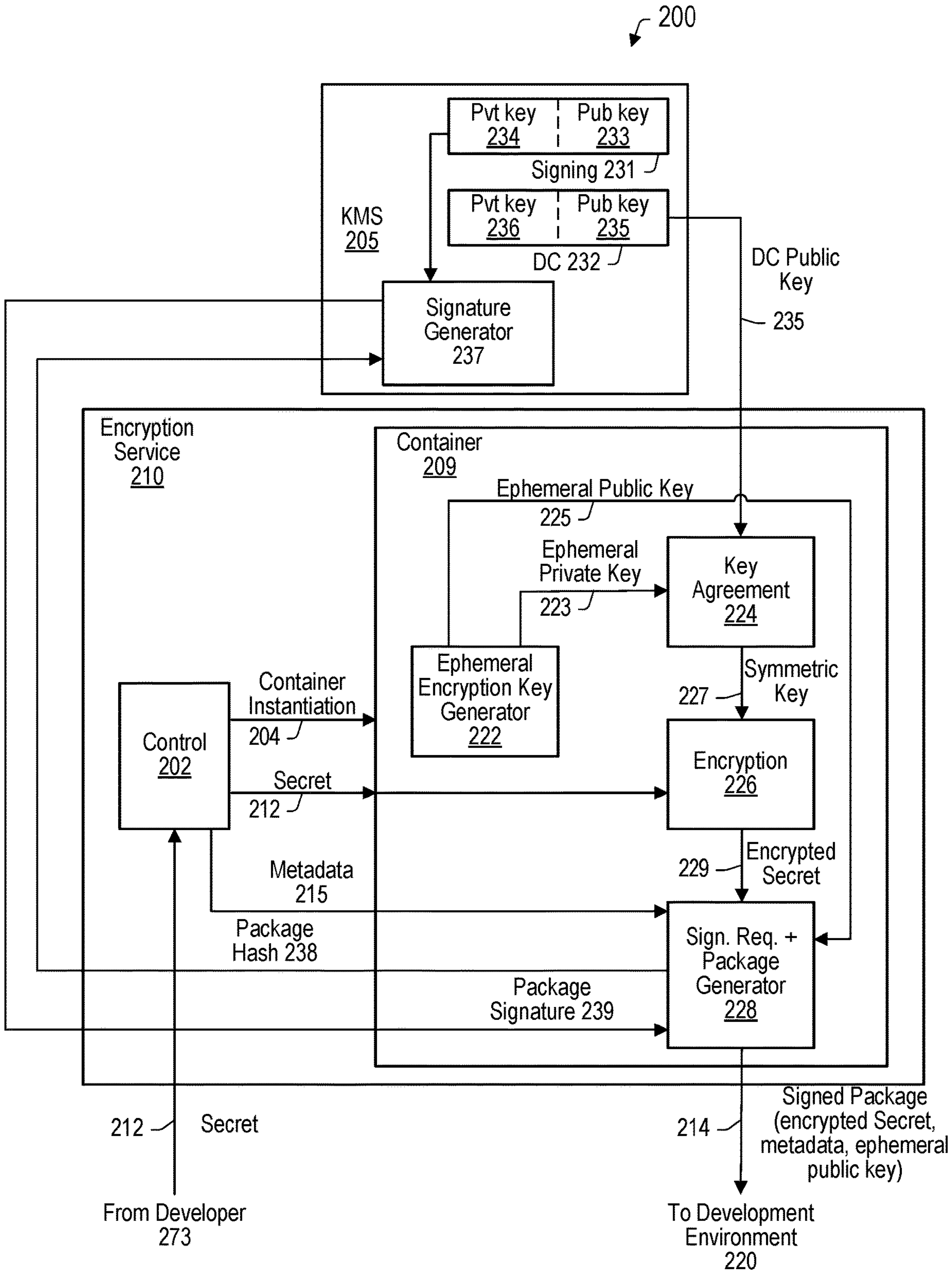
FIG. 2 is a block diagram of one embodiment of an encryption service for encrypting a secret within a software development environment.

FIG. 2 is a block diagram of one embodiment of a computer system for encrypting a secret 212 of an application within a software development environment. Throughout this disclosure, elements that are the same or similar to those previously illustrated in other Figures are numbered similarly (e.g., encryption service 110 and encryption service 210). As shown, computer system 200 includes KMS 205 and encryption service 210, which may be implemented on an application server (and can thus be referred to as an encryption server). As will be described, computer system 200 is configured to encrypt secrets and sign the encrypted secrets in a manner such that they can be decrypted only using a key accessible within the data center running the application.

KMS 205 protects, manages, and performs operations relating to cryptographic keys. For example, KMS 205 can store keys for key owners throughout the system (e.g., data center 130), and perform digital signatures on behalf of these key owners. Typically, a KMS will include a hardware security module (HSM), which is a dedicated piece of hardware that includes a processor subsystem specifically designed for cryptographic operations. HSMs also typically include various physical security measures to provide a degree of tamper resistance.

FIG. 2 depicts various keys that are managed by KMS 205. In the depicted embodiment, keys 205 include signing key pair 231 and data center (DC) key pair, which is for data center 130. (Other data centers will have respective data center key pairs.) The components of these key pairs are available to various entities within computer system 200 depending on the nature of the key. For example, DC public key 235 is accessible throughout computer system 200. As will be described, key 235 is used by encryption service 210. In contrast, DC private key 236 is only accessible by an entity within data center 130. Signing key pair 231 is associated with encryption service 210. Accordingly, signing private key 234 is accessible only by encryption service 210. Signing public key 233, on the other hand, is accessible throughout system 200 in order to verify signatures created using key 234. Keys in key pairs 231 and 232 are backed by certificates issued by a certificate authority (CA) and signed with the CA's private key, allowing entities to verify the authenticity of these certificates as well as the corresponding keys. (The public keys may also be stored in other locations, including a Git repository or even within a common program executed by various computing devices in computer system 200.)

Encryption service 210, in various embodiments, is executable to encrypt secret 212 and return a signed package 214 that includes the encrypted secret. Signed package 214 may then be routed within a development environment 220. In some embodiments, secret 212 may be provided by a developer as an input to encryption service 210. In other embodiments, secret 212 may be generated within encryption service 210 by a secret creation module (not shown in FIG. 2) based on secret parameters. For example, a developer might specify certain parameters in a call to encryption service 210. Some implementations of encryption service 210 may be able to encrypt incoming secrets as well as secrets created within service 210.

In the depicted embodiment, encryption service 210 includes a control module 202, which is executable to instantiate a container 209. As is understood in the software development art, a container is a software package that includes software code, operating system libraries, and dependencies required to execute code regardless of the environment in which the code is to run (e.g., developer's laptop, test environment, production, physical machine in data center, private or public cloud). KUBERNETES and DOCKER are two well-known platforms for creating and managing containers. Control module 202 may, in some implementations, simply be responsible for spawning container 209, which encrypts secret 212, causes it to be signed, and then terminates.

In the depicted embodiment, container 209 includes various software modules, including an ephemeral encryption key generator 222, key agreement module 224, an encryption module 226, and a signature request and package generator module 228, which provides a signed package 214 with an encrypted secret 229 to development environment 220. This division of functionality between modules can vary in other embodiments. Upon receiving secret 212, ephemeral encryption key generator 222 generates an ephemeral key pair composed of an ephemeral public key 225 and an ephemeral private key 223. The key pair is "ephemeral" in that it is generated specifically for secret 212 and may be used for a single execution of the establishment process for symmetric key 227. In other embodiments, keys may be reused when creating symmetric keys.

Key agreement module 224 utilizes ephemeral private key 223 and a data center public key 235 to generate symmetric key 227. For example, in some embodiments, the key agreement scheme may be ECDH (Elliptic Curve Diffie-Hellman Key Exchange). But any suitable key agreement scheme may be employed. In some cases, key agreement module 224 may produce additional information (not shown) such as random numbers used to seed the creation of multiple keys.

Encryption module 226 utilizes symmetric key 227 to encrypt secret 212 to produce encrypted secret 229. Package generator 228 receives encrypted secret 229 and ephemeral public key 225 from the ephemeral encryption key generator 222. Ephemeral public key 225 will be used during the decryption process to derive the symmetric key 227.

Package generator 228 may also include metadata 215 in the package. For example, metadata 215 might identify an application (or applications) that will subsequently be permitted to decrypt secret 212. Examples of metadata 215 include, but are not limited to, service name, period of time during which a secret is valid, secret type, functional domain (FD)/functional instance (FI), and the like. An FI is a functional instance which is equivalent to a data center. A given FI will host one or more functional domains. A functional domain is a logical boundary around a set of capabilities/features/services that can be built and delivered independently of the other capabilities/features/services. Each functional domain can be thought of as a set of cohesive business or technical use case functionalities.

Package generator 228 encapsulates information such as encrypted secret 229, metadata 215, and ephemeral public key 225 in a package, and then generates a cryptographic hash of the bytes in the package to produce cryptographic hash 238, which is then sent to the signature generator 237. Signature generator 237 uses signing private key 234 to sign cryptographic hash 238, thus creating package signature 239. Package signature 239 is sent back to package generator 228, which appends the signature to the package that was hashed, and returns the result as signed package 214. (References to "signing a package" herein should be understood to referring to signing a hash of the contents of such a package.)

Various possible formats of signed package 214 are possible. One such format can be comprised of various fields as follows: [<format header>, <certificate backing signature>, <key agreement information>, <cipher text>, <signature>]. The fields other than <cipher text> and <signature> may be in plain text, and the fields may be arranged in many possible orders. The field <format header>, which may be of a predetermined length, can indicate where in the array of bits that makes up the package each field begins. In some cases, the package may include the certificate of the entity signing the package, which in turn includes the public key needed to verify the signature. In other implementations, the <certificate backing signature> field may be optional if signature public key 233 has already been distributed or is available. The field <key agreement information> may include ephemeral public key 225. In some implementations, there may be additional information in this field, such as information specifying the type of key agreement function, HKDF data, etc. The <cipher text> field is the encrypted portion of the message, and will ultimately be decrypted within data center 130. In some cases, the metadata for the secret may be within the <cipher text> field; in other cases, the metadata may be another plain text field. The <signature> field may be of some predetermined length (e.g., 256 bits) and may appear at the end of the message in some embodiments.

As will be described, signed package 214 can subsequently be verified in data center 130 at least two ways: through checking its signature, and checking the metadata against the entity requesting decryption. Additionally, encrypted secret 229 can be decrypted only by an entity having access to DC private key 236 since this key is needed to derive symmetric key 227. (After symmetric key 227 is generated within container 209, encryption service may discard ephemeral keys 223 and 225 after generating signed package 214.) Signing the data prevents secret data from coming into production from unauthorized parties. Suppose a first secret in a code repository is encrypted but unsigned. A malicious actor could insert a new (potentially weaker) secret in its place. A data signature prevents this form of attack, as it allows the applications to determine the provenance of the secret.

Figure 3:
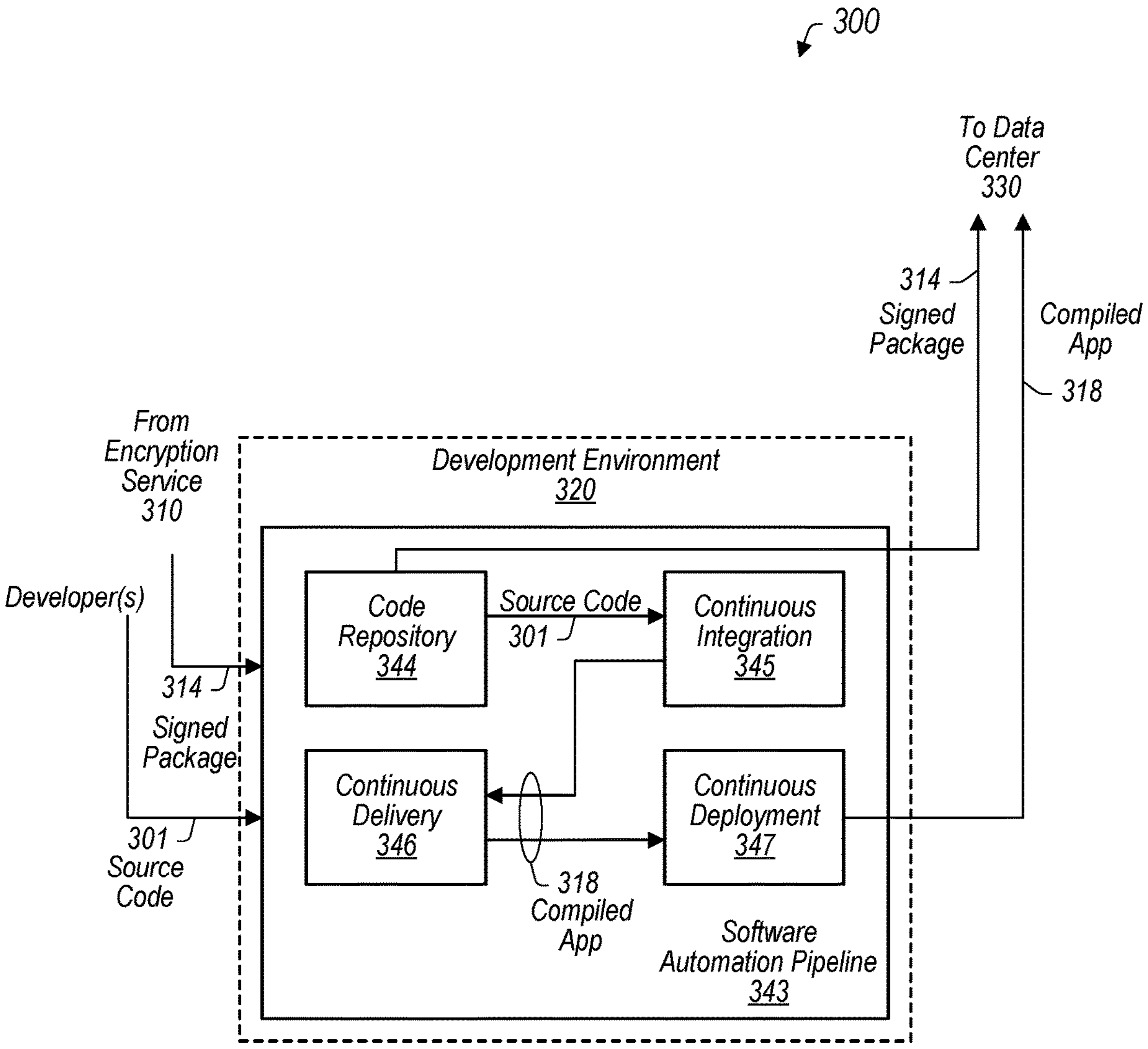
FIG. 3 is a block diagram illustrating example elements of a software automation pipeline that passes encrypted secrets, according to some embodiments.

FIG. 3 is a block diagram of one embodiment of a computer system 300 that includes a software automation pipeline 343. As shown, pipeline 343 is coupled to receive signed package 314 from encryption service 310 and source code 301 from developers. Pipeline 343 exists within a software development environment 320, in which developers write source code 301 for an application that will ultimately be compiled and executed on a production server within data center 330.

Under a typical software development process, there are a number of steps that software undergoes as source code is converted into a final, compiled version of an application that is run on a production server. These steps include but are not limited to, integration, testing, delivery, and deployment. A variety of tools and platforms exist for automating some or all of these steps in a manner that shortens development time. This collection of tools and platforms and routing may be referred to by various names. For example, the combination of continuous integration and continuous delivery is often referred to in the art as a "CI/CD pipeline." The combination of continuous integration and continuous deployment is also referred to as a CI/CD pipeline. As used in this disclosure, this pipeline will be referred to generically as a "software automation pipeline," which encompasses continuous integration/continuous delivery, continuous integration/continuous deployment, or any other combination of DevOps techniques that are used to produce production code.

As has been described, encryption service 310 is executable to receive or create a secret for an application and create a signed package that includes an encrypted version of the secret. The secret will ultimately be used within data center 330. FIG. 3 illustrates that secret security can be improved by using encryption service 310 to encrypt secrets for a large extent of their life cycle. That is, secrets can be encrypted by service 310 after creation, and then pass through software automation pipeline 343 to data center 330, thereby decreasing chances for the secrets to be compromised along the way.

As noted, software automation pipeline 343 includes various services to facilitate various automation actions related to software development (e.g., build, test, deploy, etc.). In the depicted embodiment, software automation pipeline 343 includes code repository 344, continuous integration module 345, continuous delivery module 346, and continuous deployment module 347. Different modules can exist in other software automation pipelines, as well as different flows within the individual modules. Many different configurations of software automation pipeline 343 are possible.

In the depicted embodiment, source code 301 (which may be received from a developer) is stored in code repository 344. As is known in the art, a code repository is an archive for code, and is frequently used to promote collaboration on software development teams. GitHub is a well-known code repository. One feature of code repositories that is frequently used is software version control (SVC), which is used to manage changes in the source code.

As shown, source code 301 can be supplied from code repository 344 to continuous integration module 345. Generally speaking, continuous integration is the practice of automating the integration of code changes from multiple contributors in a single software project (i.e., automating software builds). This paradigm allows developers to merge code changes into a central repository where builds and tests are run. Automated tools are used to assert the new code's correctness before integration. Continuous integration module 345, in various embodiments, includes a mechanism to receive and review source code 301, and to compile it as a part of a continuous build process, which then undertakes automated unit testing (i.e., testing individual blocks of code). An organization may compile a list of tasks and distribute them among software engineering team members for delivery. Using continuous integration module 345 enables these software development tasks to be developed in parallel among the assigned developers. Once the tasks are completed, the resulting changes are introduced into continuous integration module 345 to be integrated with the rest of the project.

Continuous delivery module 346 is representative of one or more tools or platforms that perform the software engineering paradigm of continuous delivery. Continuous delivery is an extension of continuous integration and involves automatically preparing code changes for being deployed (e.g., released to production). Continuous delivery module 346 can perform automating testing at a scale above unit testing so that the code changes can be verified comprehensively before deployment. For example, automated testing may include UI testing, integration testing, load testing, etc. In the illustrated embodiment, continuous delivery module 346 runs automated tools on compiled code 318 received from continuous integration module 345 to generate an artifact for further handling.

Continuous deployment, as is known in the art, is a process of taking tested applications and deploying them into a deployment environment using various known strategies based on the deployment risks involved. Continuous deployment focuses on the actual installation and the distribution of bits that comprise the software application and the automation required to do so. As environments change from non-production to the staging environment and eventually to production, the number of endpoints that are deployed increases. Continuous deployment focuses on the path of least resistance to get the software into the needed environment(s). For example, continuous deployment module 347 might use various release strategies for a particular scenario—for example, "Blue/Green" for a Big-Bang switch-over, "Canary" for gradual rollouts, "A/B" for other deployments, etc.

There are numerous proprietary and open-source tools/platforms that can be used for various tasks within software automation pipeline 343. Two popular ones are Jenkins and Spinnaker. Originally developed for continuous integration (CI), today Jenkins orchestrates the entire software delivery pipeline. For some organizations, automation extends even further, to continuous deployment. Spinnaker is an open-source, multi-cloud (i.e., compatible with multiple cloud providers), continuous delivery tool that provides visibility and control to an organization's software delivery process.

To sum up, a software automation or CI/CD pipeline can compile, build, test, and deploy the source code into an environment such as production server 150. In the illustrated embodiment, code repository 344 pushes signed package 314 to data center 330. Signed package 314 may be sent separately or along with the compiled application 318 to data center 330. Therefore, the signed package 314 that contains encrypted secrets can be safely transmitted from development environment 320 to data center 330 through software automation pipeline 343, decreasing chances for the secrets to be compromised. Note that the production secrets are not generally needed in the context of software automation pipeline 343. The signed packages for the secrets may be treated in much the same way as a configuration file would be. To the extent that testing is done in pipeline 343 that needs to use secrets, non-production versions of the secrets may be used.

Figure 4A:
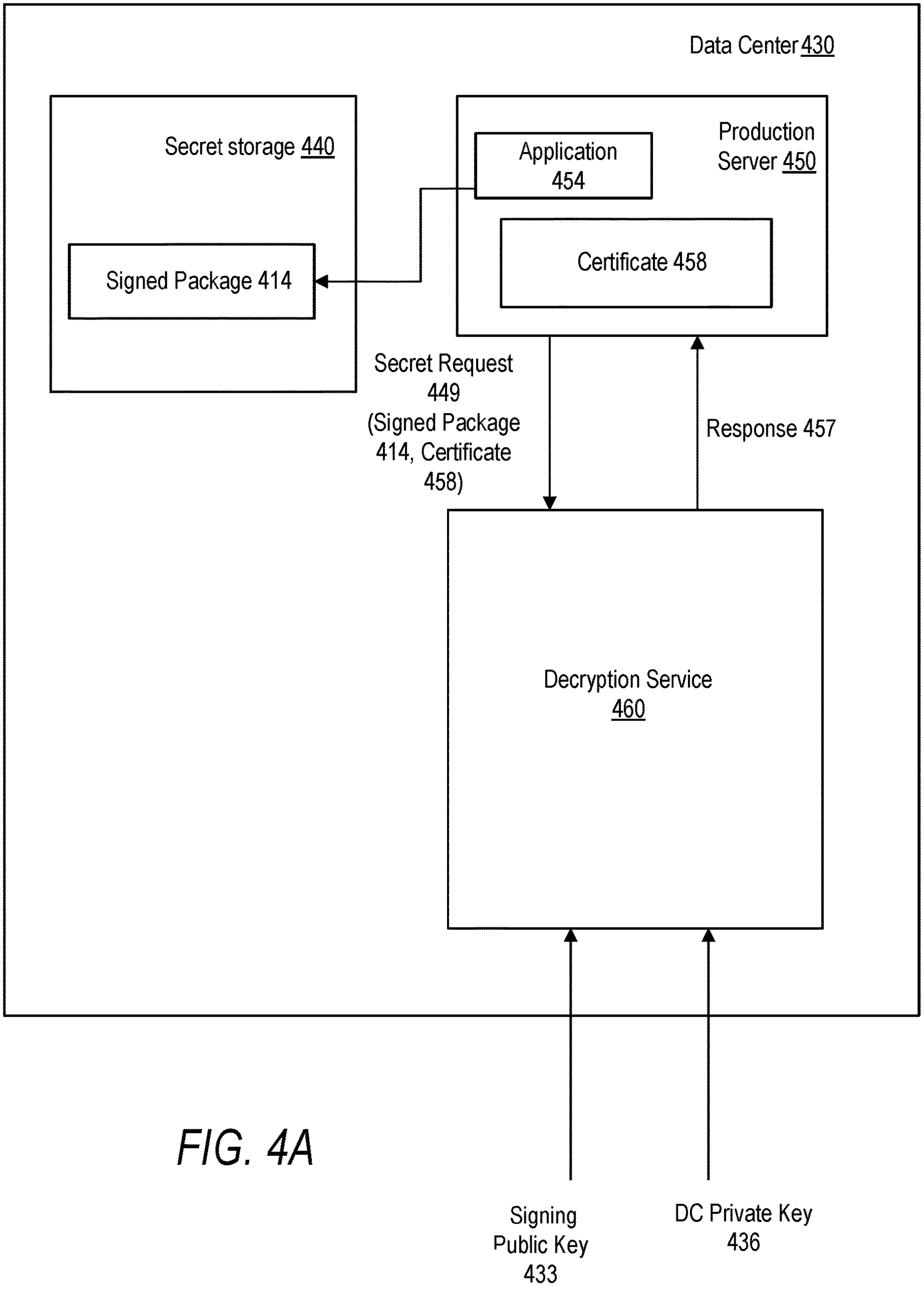
FIG. 4A is a block diagram illustrating the use of a decryption service to decrypt encrypted secrets within a data center.

FIG. 4A is block diagram of one embodiment of a data center 430 that is configured to execute production versions of an application that utilizes encrypted secrets. As shown, data center 430 includes secret storage 440 with signed package 414, decryption service 460, and production server 450, on which application 454 is executing. Application 454 has an identity in the form of certificate 458.

In the paradigm illustrated in FIG. 4A, application 454 will periodically need to utilize a secret such as the one that is encrypted within signed package 414 residing in secret storage 440. As noted, secret storage 440 may be, without limitation, a secret vault, memory in the file system of data center 430, etc. When such a secret is needed for execution, application 454 may make a request 449 to decryption service 460 for the decrypted secret. In some embodiments, application 454 may retrieve signed package 414 and pass that as part of request 449. Request 449 may also include some indicia of the identity of the requesting entity (here, application 454). In one embodiment, request 449 may include certificate 458. As will be described with respect to FIGS. 4B-C, decryption service is executable to evaluate request 449 and return a response 457. If the package is appropriately verified (using signing public key 433 in the depicted embodiment), the symmetric key may be derived (using DC private key 436) and the decrypted secret is returned as part of response 457. If package verification fails, response 457 may indicate that request 449 is rejected and an appropriate error may be logged. Once decrypted, a secret may be retained in the memory space of application 454 until the application is restarted, such that repeated use a given secret will not require multiple decryption operations.

Figure 4B:
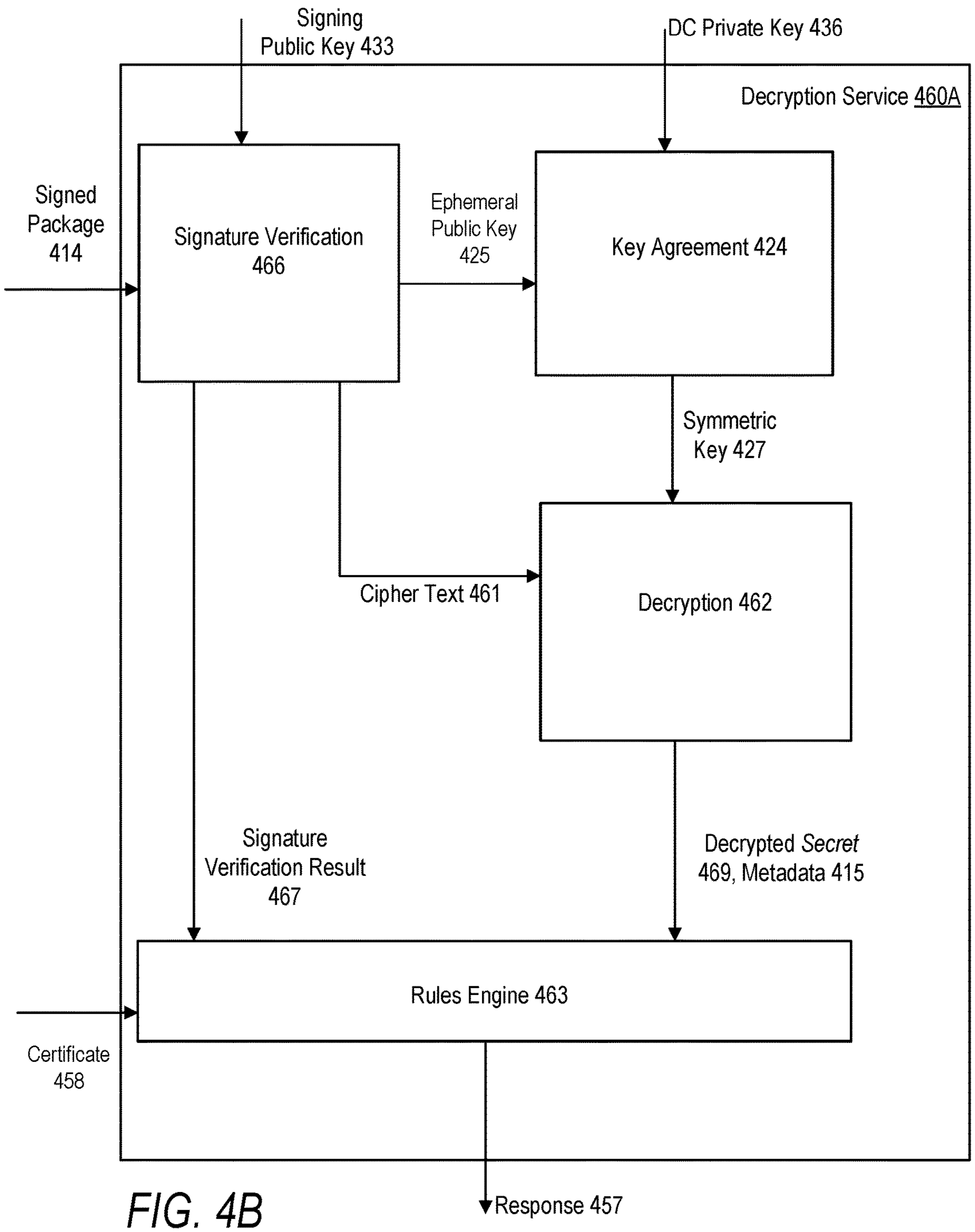
FIGS. 4B-C are block diagrams illustrating alternate embodiments for performing package verification in a decryption service that decrypts secrets within a data center.

FIG. 4B is a block diagram illustrating one embodiment of performing verification of signed package 414 within decryption service 460A. In the depicted embodiment, the metadata 415 for the secret is encrypted. That is, metadata 415 is part of the cipher text of package 414, as opposed to other information in package 414 that is in plaintext. For example, one possible format for package 414 being handled by decryption service 460A is [<format header>, <certificate backing signature>, <key agreement information>, <cipher text>, <signature>] (described in more detail above with respect to FIG. 2).

As shown, signature verification module 466 receives signed package 414 and checks its signature. In one scenario, the signature is appended at the end of the data in package 414. Thus, module 466 may remove the signature portion, which has been signed using signing private key 434. The removed signature portion may be verified using signing public key 433 to reveal the hash value computed by encryption service 210. Module 466 may then use the same hash algorithm previously employed by encryption service 210 on the remainder of signed package 414 to compute a second hash value. If the two hash values match, signature verification passes; otherwise, it can be presumed that package 414 has been tampered with (or corrupted) and signature verification fails. Either way, the result is reported as signature verification result 467 to rules engine 463. If 467 indicates a failure, response 457 indicates that request 449 has failed.

If 467 indicates a match, package verification continues. Key agreement information in package 414 such as ephemeral public key 425 is passed to key agreement module 424, and the encrypted portion of package, cipher text 461, is passed to decryption module 462. Key agreement module 424 uses ephemeral public key 425 (the other half of the ephemeral key pair used to originally generate symmetric key 227) and DC private key 436 (the other half of the DC key pair used to originally generate symmetric key 227) to derive symmetric key 427 (which is the same as symmetric key 227). (Although the processes for producing symmetric keys 227 and 427 mirror one another, for clarity, the present disclosure refers to "generating" symmetric key 227 and "deriving" symmetric key 427. The terms are not intended to have different meanings, but rather are used for clarity to distinguish between the different operations.)

Decryption module 462 receives symmetric key 427 and decrypts cipher text 461 to produce plain text 465. Plain text 465 includes, in this embodiment, decrypted secret 469 and decrypted metadata 415. Plain text 465 may also include a header that indicates how to separate the decrypted plain text into its constituent parts.

Decrypted secret 469 and decrypted metadata 415 are passed to rules engine 463, which also receives certificate 458 of application 454. Rules engine 463 then performs a second type of package verification. Previously, module 466 checked whether signed package 414 had been altered. Rules Engine 463 can additionally check whether the entity making the call for decryption of the secret is actually permitted to access the decrypted secret—that is, whether the requesting entity matches the indicated entity indicated by the metadata. This check can be performed in various ways. In one embodiment, decrypted metadata 469 may simply be compared against information included in certificate 458 to see if there is a match. Additionally, rules engine 463 can issue a challenge to application 454 to prove possession of the private key corresponding to the public key included in certificate 458. If this check passes, decrypted secret 469 is returned as part of response 457. If, on the other hand, this check fails, rules engine 463 may indicate failure of request 449 via response 457. Additionally, rules engine 463 may cause a notation to be written to an appropriate system error log (not shown).

Figure 4C:
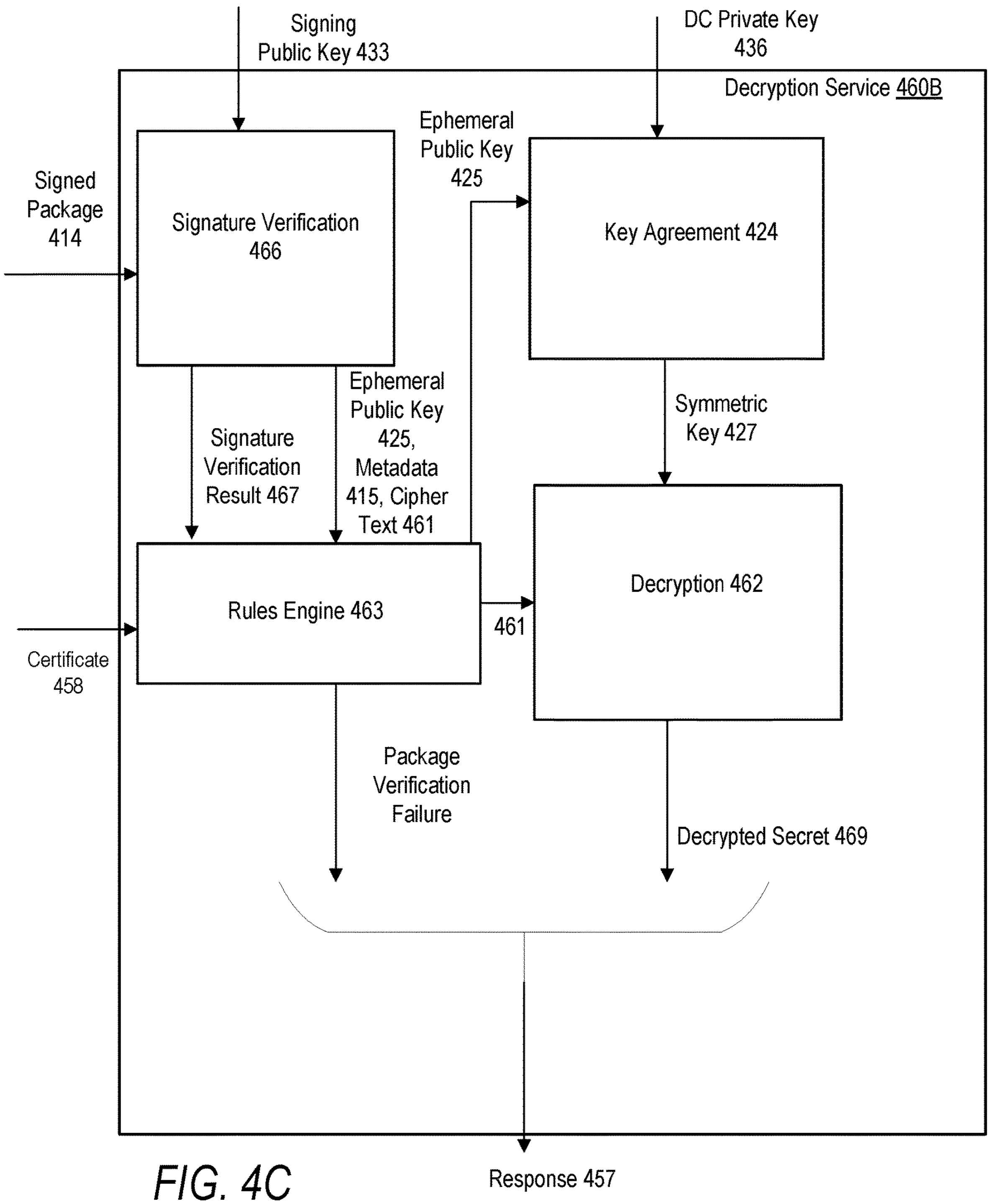

FIG. 4C is a block diagram illustrating an alternate embodiment of performing verification of signed package 414 within decryption service 460B. In the depicted embodiment, metadata 415 for the secret is not encrypted. That is, metadata 415 is part of the plain text of package 414, as opposed to other information in package 414 that is in cipher text. For example, one possible format for package 414 being handled by decryption service 460B is [<format header>, <certificate backing signature>, <key agreement information>, <metadata>, <cipher text>, <signature>].

This difference in package format leads to a slightly different implementation of the decryption service. Signature verification module 466 operates as described with respect to FIG. 4B, using signing public key 433 to verify the signature within package 414. Signature verification result 467 reports the result of the signature verification to rules engine 463, along with plain-text metadata 415, ephemeral public key 425, any other key agreement information, and cipher text 461.

Assuming the signature verification result 467 indicates that this check passed, rules engine 463 then performs the identity check on the requesting entity as described above using certificate 458 and metadata 415. If this additional package verification step passes, decryption of cipher text 461 can proceed. If result 467 indicates a failure or the identity check indicates a failure, a package verification failure is reported as response 457, and any needed error logging is performed. On the other hand, if result 467 indicates success and the identity check indicates success, ephemeral public key 425 any other key agreement information is passed to key agreement module 424, which operates as described with respect to FIG. 4B to derive symmetric key 427. Similarly, rules engine 463 passes cipher text 461 to decryption module 462, which uses symmetric key 427 to produce decrypted secret 469 as part of response 457.

Figure 5A:
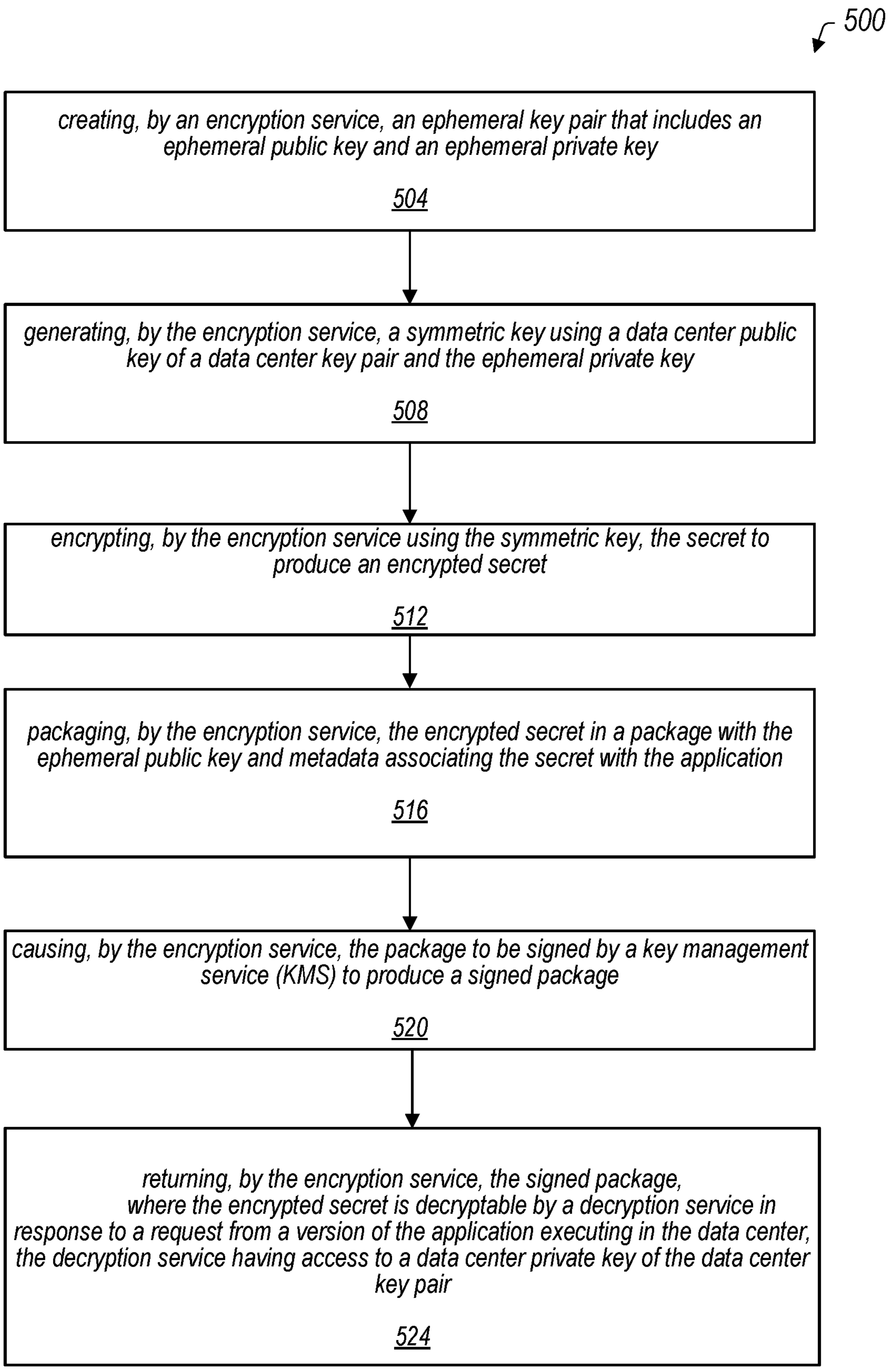

Operations associated with the systems of FIGS. 1-3 and 4A-C are now summarized with respect to FIGS. 5A-C. FIG. 5A is directed to the operations of the encryption service, FIG. 5B is directed to the operations of the software automation pipeline, and FIG. 5C is directed to operations occurring within the data center.

FIG. 5A is a flow diagram of a method 500 for encrypting a secret for use by an application executing in a data center. Method 500 begins in 504, in which the encryption service creates an ephemeral key pair that includes an ephemeral public key and an ephemeral private key. In 508, the encryption service generates a symmetric key using a data center public key of a data center key pair and the ephemeral private key. The encryption service then encrypts the secret to produce an encrypted secret in 512.

Method 500 continues in 516, in which the encryption service packages the encrypted secret in a package with the ephemeral public key and metadata associating the secret with the application. The encryption service then causes the package to be signed by a key management service (KMS) to produce a signed package in 520. One embodiment of method 500 concludes in 524 with the encryption service returning the signed package. As a result of method 500, the encrypted secret within the package is decryptable by a decryption service in response to a request from a version of the application executing in the data center, the decryption service having access to a data center private key of the data center key pair.

FIG. 5B is a flow diagram of a method 540 for protecting access to secrets used by an application within a software development environment. Method 540 is performed by a software automation pipeline implemented by one or more computer systems within the software development environment. Method 540 begins in 545, in which the software automation pipeline receives code for the application, and one or more packages that include encrypted versions of the secrets. In 550, which may be performed after various automated tasks performed by software automation pipeline 343, the software automation pipeline outputs, to a data center, a production version of the application and the one or more packages. The data center includes a production server for executing the application, and the data center is configured to implement a decryption service that decrypts the one or more packages such that unencrypted versions of the secrets are accessible by the production version of the application, but are inaccessible outside the data center.

FIG. 5C is a flow diagram of a method 560 for handling a signed encrypted package within a data center. Method 560 begins at 564, in which a signed package that includes an encrypted version of a secret referenced by a first application is stored at a storage location in a data center. The encrypted version of the secret has been encrypted by an encryption service using a symmetric key that has been generated using a data center public key of a data center key pair of the data center, and the signed package includes information indicating that the secret is associated with the first application.

In 568, the first application executing on a production server within the data center sends a request for a decrypted version of the secret to a decryption service executing within the data center. In 572, the decryption service begins handling the request by verifying the signed package. In 576, in response to the signed package being verified, the decryption service derives the symmetric key using a data center private key of the data center key pair accessible to the data center. In 580, the decryption service decrypts the encrypted version of the secret using the symmetric key, and then returns the decrypted version of the secret to the first application in 584.

Numerous modifications and additions to method 560 are contemplated and possible. For example, the symmetric key of method 560 may have been generated by the encryption service using 1) the data center public key of the data center key pair and 2) an ephemeral private key of an ephemeral key pair generated by the encryption service. In such an embodiment, the signed package may include an ephemeral public key of the ephemeral key pair, and the decryption service is executable to decrypt the secret by deriving the symmetric key using 1) the data center private key of the data center key pair and 2) the ephemeral public key.

With regard to the signature of the signed secret package in method 560, it may have been generated using a signing private key of a signing key pair, such as a signing key pair of the encryption service. (The signing key pair may be backed by a key management service in one embodiment, with the result that the signing public key is accessible to the decryption service.) Verifying the package may include multiple components. First, verifying the signature may be performed using a signing public key of the signing key pair. In some embodiments, the signed package may include metadata (e.g., written by the encryption service) indicating that the secret in the signed package is associated with the first application. Verifying the package may thus additionally include the decryption service checking that an identity of the entity making the request for decryption of the secret is the same as the identity of the entity specified by the metadata.

In some implementations, the signed package is received from a software automation pipeline that automatically performs compiling and testing the first application. The storage location at which the signed secret package is stored within the data center can be any type of storage including the file system of the data center, S3 storage, or a relational database. In some cases, the storage location is within a secret repository that has an independent encryption/decryption scheme. In various embodiments, the encryption service and/or the decryption service may execute within a container. In other embodiments, the encryption service can generate the secret itself based on secret parameters supplied in the call to the encryption service.

In some embodiments, method 560 further comprises receiving, at the data center, a manifest file for the first application, the manifest file specifying a set of secrets to be created for use by the first application (e.g., to authenticate to other applications executing in the data center). The method may further comprise creating the set of secrets and storing the created secrets within the data center for use by the first application executing on the production server (e.g., to communicate with the other applications). These steps may be performed such that the created secrets are not accessible outside the data center.

In addition to the methods described with reference to FIGS. 5A-C and their variations, non-transitory computer-readable storage media storing program instructions capable of being executed (i.e., being executable) to perform any of the disclosed techniques are also contemplated. Similarly, computer systems that include computing devices storing program instructions capable of being executed to perform any of the disclosed techniques are additionally contemplated.

Manifest File

In the embodiments described above, secrets are created and encrypted outside the data center. In some embodiments, secrets may be created by a developer and provided to an encryption service for encryption. The resulting signed package within the encrypted secrets may then pass through a software automation pipeline and then to a data center where they can be decrypted and utilized by an application with which they are associated. In some embodiments, though, secrets may be created with the encryption service itself. Rather than taking a secret as input, the encryption service may instead receive a manifest file that includes specifications for one or more secrets that need to be created for a particular application.

Figure 6:
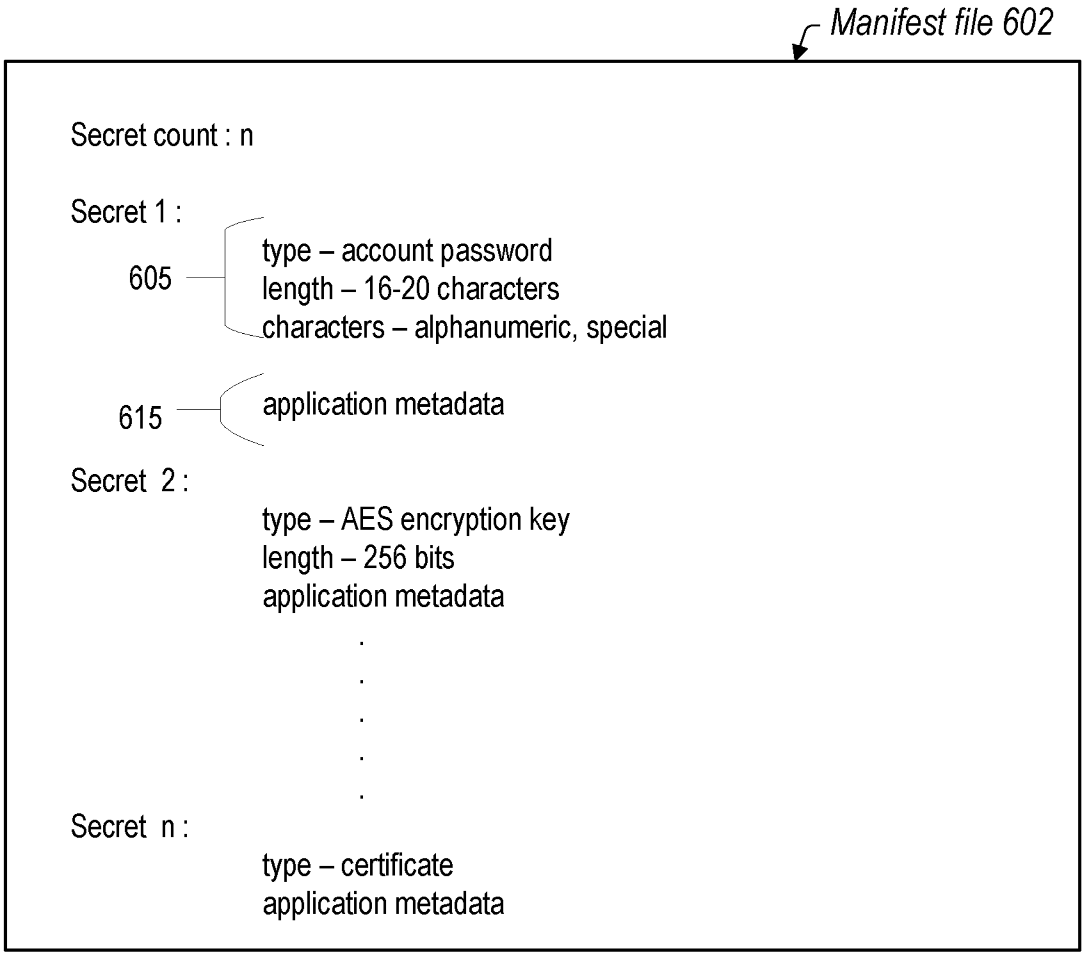
FIG. 6 is a block diagram illustrating one example of a manifest file within a software development environment.

A simple example of a manifest file 602 is depicted in FIG. 6. This example shows specifications for n secrets. These secrets may be of various types (illustrated in this example are an account password, an encryption key, and a certificate). A given secret specification may include both secret parameters 605 and application metadata 615. Secret parameters 605 place restrictions on attributes of the to-be-generated secret. For example, parameters 605 specify a length range for an account password, as well as the nature of the characters used within the password. Application metadata 615, on the other hand, includes information about the application or applications with which the secret is associated. (In some cases, a secret may be usable by multiple applications.) Other types of metadata may also be specified, including time limits on secret validity. As another example, consider the following secret specification: {"name":"mysecret-240", "type":"string", "length":"32", "services":"corecrm,db", "fi":"pdx"}. Secret information 605 of this secret includes its name ("mysecret-240," where 240 is the version number), the fact that it is a string variable of length 32 bytes. Application metadata 615 includes the services that the secret is associated with (corecrm and db), as well as the functional instance "pdx."

The inventors have recognized the usefulness of a manifest file in secret protection, and have further recognized that in some scenarios, a manifest file may be used to specify secret creation within a data center. Some secrets are used only within a single data center—for example, a particular secret may be used by only two applications (both of which execute in the same data center), or by a single application. In such instances, rather than generate the particular secret and then send it to that data center, the inventors propose instead to send a manifest file to the data center that specifies properties of secrets that need to be created. A service within the data center will then generate the secrets within the data center, and the secrets will be used by the applications within the data center. Significantly, the secrets will never exist outside the data center at any time.

Figure 7:
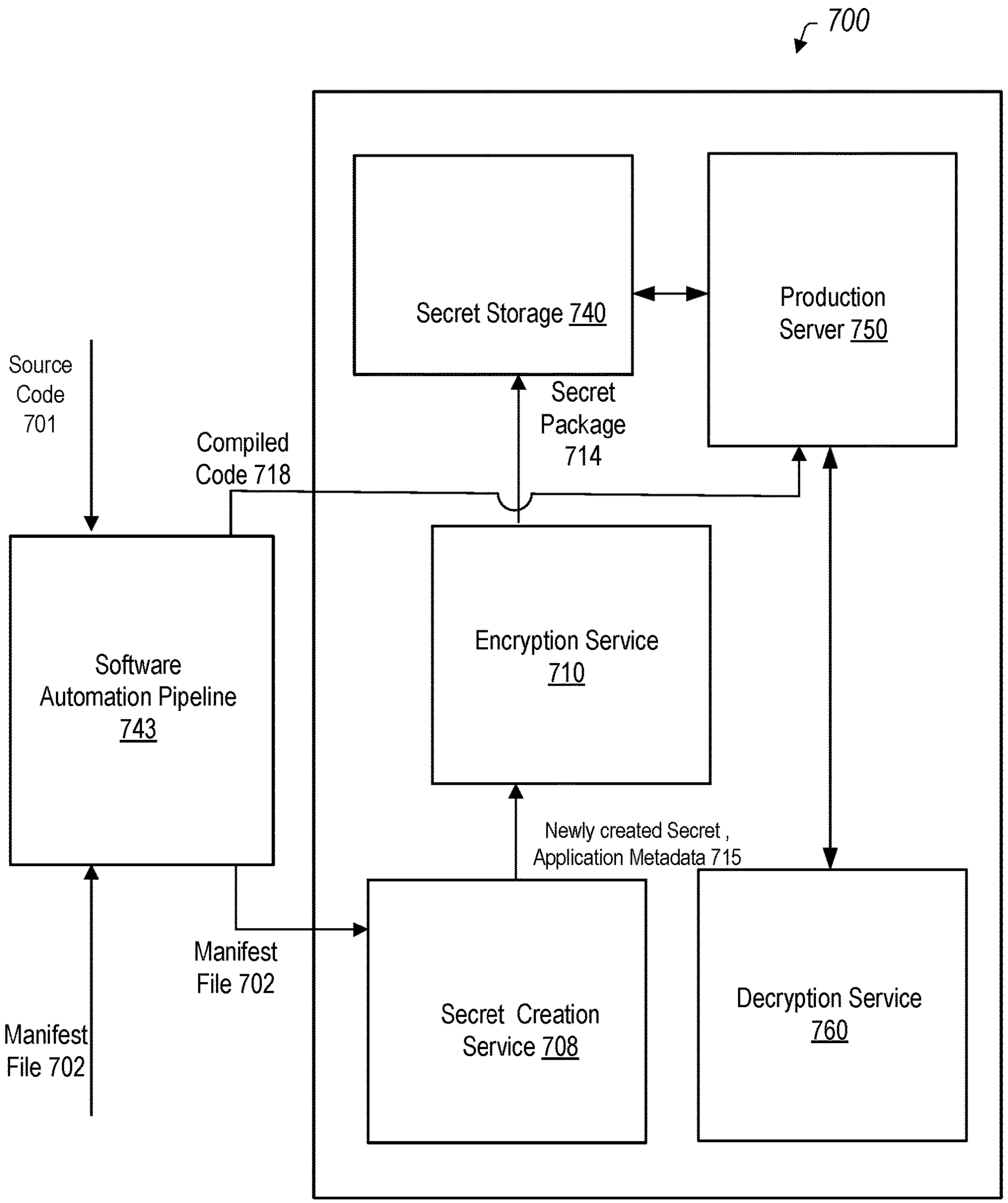
FIG. 7 is a block diagram of one embodiment of a software development environment in which a manifest file is supplied to a software automation pipeline and then to a data center.

This paradigm is illustrated in FIG. 7, which shows one embodiment of a computer system 700 for distributing a manifest file to a data center. System 700 includes similar elements as depicted in earlier Figures, including software automation pipeline 743 and data center 730. Data center 730 includes such elements as secret storage 740, production server 750, and decryption service 760. But unlike earlier-described embodiments, data center 730 includes encryption service 710 and secret creation service 708. (In earlier embodiments, encryption service 710 existed outside the data center.)

As shown, information such as source code 701 and manifest file 702 is supplied to the software automation pipeline 743. Ultimately, compiled code 718 and manifest file 702 are deployed to data center 730. Compiled code 718 may be written to production server 750, while manifest file 702 is provided to secret creation service 708.

Secret creation service 708, in one embodiment, reads manifest file 702 and creates the secrets specified therein. Service 708 may include (or call) a particular routine for each possible type of secret that it is capable of creating. These routines will generally use random or pseudo-random techniques in the course of secret creation, while meeting any particular constraints placed by secret parameters 605.

Once a secret is created, secret creation service 708, in one embodiment, calls encryption service 710, passing both the newly created secret and application metadata 615. Encryption service 710 encrypts the secret. The metadata can be encrypted as well in some embodiments. The encryption may function as has been described above, but since the secret is now created within the data center, a different encryption scheme may be utilized. Once encrypted, a secret package 714 is stored to secret storage 740. The package may or may not be signed, depending on the level of security that is desired.

When a particular secret is needed by an application executing on production server 750, production server 750 may retrieve a secret from secret storage 740 and then pass the secret to decryption service 760. Decryption service 760 may operate in a manner similar to that described in FIGS. 4A-C, either returning the decrypted secret or an error message indicating failure.

Figure 8B:
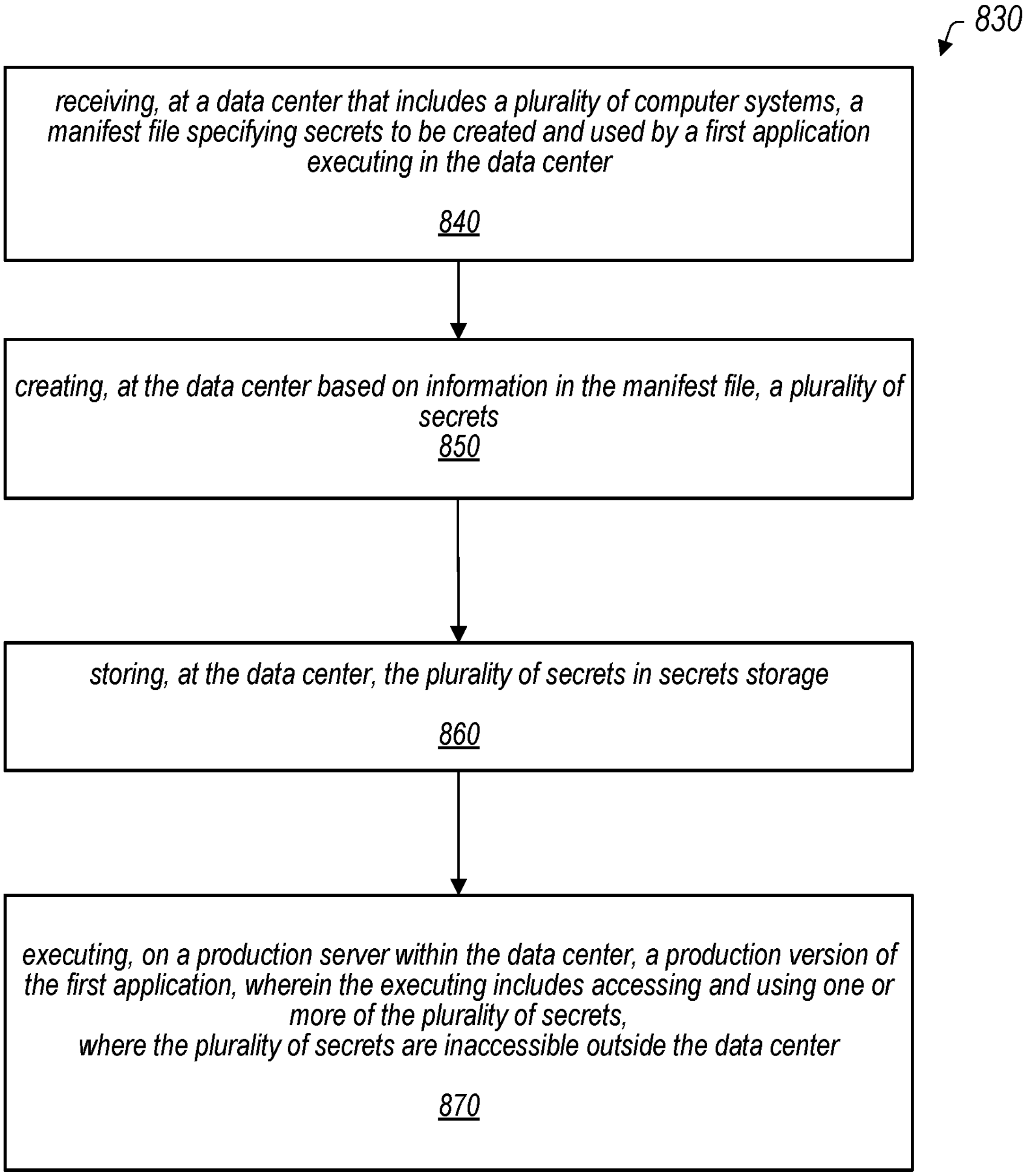

Operations associated with the systems of FIGS. 6-7 are now summarized with respect to FIGS. 8A-B. FIG. 8A is directed to the operations of the software automation pipeline. FIG. 8B is directed to operations within the data center.

FIG. 8A is a flow diagram of one embodiment of a method for handling a manifest file in a software automation pipeline. Method 800 begins in 810, in which a software automation pipeline implemented by one or more computer systems within the software development environment receives certain information. This information includes source code for a first application and a manifest file that specifies secrets to be created and used by the first application (e.g., to communicate with a second application within a common data center).

Method 800 continues in 820, in which the software automation pipeline outputs certain information to the common data center. This information includes a production version of the first application and the manifest file. The data center includes one or more production servers for the first and second applications. The data center is configured to create the secrets specified by the manifest file such that the secrets are accessible by the production versions of the first application (and potentially the second application) within the data center, but are inaccessible outside the data center.

FIG. 8B is a flow diagram for one embodiment of a method for handling a manifest file in a data center. Method 830 begins in 840, in which a data center that includes a plurality of computer systems receives a manifest file specifying secrets to be created and used by a first application executing in the data center (e.g., to communicate with a second application also executing in the data center). In 850, a plurality of secrets are created at the data center based on information in the manifest file. The created plurality of secrets are then stored in secret storage at the data center in 860.

In 870, a production version of the first application executes on a production server within the data center. The execution includes accessing and using one or more of the plurality of secrets (e.g., to communicate with the second application). The plurality of secrets are inaccessible outside the data center. In variations of method 800, the plurality of secrets may be encrypted before being stored in the secret storage, and may be decrypted upon being accessed by the first application.

In addition to the methods described with reference to FIGS. 8A-B and their variations, non-transitory computer-readable storage media storing program instructions capable of being executed (i.e., being executable) to perform any of the disclosed techniques are also contemplated. Similarly, computer systems that include computing devices storing program instructions capable of being executed to perform any of the disclosed techniques are additionally contemplated.

The present disclosure refers to various software operations that are performed in the context of a distributed computer system such as that shown in FIG. 1. This computer system includes, for example, a variety of services (e.g., encryption service 110), key management system 105, software automation pipeline 343, and data center 130. Each of these components either constitutes physical hardware or is executed on physical hardware.

In general, any of the services or functionalities of a software development environment described in this disclosure can be performed by a host computing device, which is any computer system that is capable of connecting to a computer network. A given host computing device can be configured according to any known configuration of computer hardware. A typical hardware configuration includes a processor subsystem, memory, and one or more I/O devices coupled via an interconnect. A given host computing device may also be implemented as two or more computer systems operating together.

The processor subsystem of the host computing device may include one or more processors or processing units. In some embodiments of the host computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computing device is usable store program instructions executable by the processor subsystem to cause the host computing device to perform various operations described herein. The system memory may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read-only memory (PROM, EEPROM, etc.), and so on. Memory in the host computing device is not limited to primary storage. Rather, the host computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network 305), or other devices (e.g., graphics, user interface devices).

A key management system such as KMS 105 can be implemented on one or more servers, which can be on-premises, in the cloud, etc. A key management service is a system for securely storing, managing, and backing up cryptographic keys. The specific types of keys that each KMS supports vary from one platform to another. Most key management services typically allow management of a variety of secrets, including SSL certificate private keys, SSH key pairs, API keys, code-signing private keys, document-signing private keys, and database encryption keys. A KMS commonly provides a web-based interface for managing keys, storage and backup of private keys, and APIs and plug-ins to integrate with other servers, systems, and software.

A KMS can create secure keys that have sufficient entropy (randomness). A KMS can also provide visibility to the keys that are in use within a particular environment, even those not created in the KMS. Still further, a KMS can set key permissions, store the keys securely (such as in a hardware security module (HSM)), backup and archive keys, and perform other tasks such as automatically rotate SSH keys for increased security.

A Hardware Security Module is a physical piece of hardware that handles key storage and cryptographic functions at scale. (There are some cloud HSMs available as well but the term HSM typically refers to the physical devices.) An HSM is a secure environment that handles key lifecycle management operations and offloads many cryptographic operations as well. HSMs can be stored as online or offline devices. For example, public certificate authorities use offline HSMs to store their root CAs to keep them as secure as possible. But some companies use online HSMs to store their private PKI's intermediate CA keys.

As has been described, the functionality of a software automation pipeline can be performed by a variety of computer systems, including those within a particular software development organization, those of third-party services such as Jenkins and Spinnaker, as well as other cloud-based computer systems.

As is understood in the art, a data center is a physical computer facility that organizations use to house their critical applications and data. A data center's design is based on a network of computing and storage resources that enable the delivery of shared applications and data.

The term "data center" is intended to cover a wide range of implementations, including traditional on-premises physical servers to virtual networks that support applications and workloads across pools of physical infrastructure and into a multi-cloud environment. In current environments, data exists and is connected across multiple data centers, the edge, and public and private clouds. A data center can frequently communicate across these multiple sites, both on-premises and in the cloud. Even the public cloud is a collection of data centers. When applications are hosted in the cloud, they are using data center resources from the cloud provider. Data centers are commonly used to support a variety of enterprise applications and activities, including, email and file sharing, productivity applications, customer relationship management (CRM), enterprise resource planning (ERP) and databases, big data, artificial intelligence, machine learning, virtual desktops, communications and collaboration services.

Data centers commonly include routers, switches, firewalls, storage systems, servers, and application delivery controllers. Because these components frequently store and manage business-critical data and applications, data center security is critical in data center design. These components operate together provide the core infrastructure for a data center: network infrastructure, storage infrastructure and computing resources. The network infrastructure connects servers (physical and virtualized), data center services, storage, and external connectivity to end-user locations. Storage systems are used to store the data that is the fuel of the data center. In contrast, applications can be considered to be the engines of a data center. Computing resources include servers that provide the processing, memory, local storage, and network connectivity that drive applications. Data centers commonly utilize additional infrastructure to support the center's hardware and software. These include power subsystems, uninterruptible power supplies (UPS), ventilation, cooling systems, fire suppression, backup generators, and connections to external networks.

Data center services are typically deployed to protect the performance and integrity of the core data center components. Data center therefore commonly use network security appliances that provide firewall and intrusion protection capabilities to safeguard the data center. Data centers also maintain application performance by providing application resiliency and availability via automatic failover and load balancing.

One standard for data center design and data center infrastructure is ANSI/TIA-942. It includes standards for ANSI/TIA-942-ready certification, which ensures compliance with one of four categories of data center tiers rated for levels of redundancy and fault tolerance. A Tier 1 (basic) data center offers limited protection against physical events. It has single-capacity components and a single, nonredundant distribution path. A Tier 2 data center offers improved protection against physical events. It has redundant-capacity components and a single, nonredundant distribution path. A Tier 3 data center protects against virtually all physical events, providing redundant-capacity components and multiple independent distribution paths. Each component can be removed or replaced without disrupting services to end users. A Tier 4 data center provides the highest levels of fault tolerance and redundancy. Redundant-capacity components and multiple independent distribution paths enable concurrent maintainability and one fault anywhere in the installation without causing downtime.

Many types of data centers and service models are available. A data center classification depends on whether it is owned by one or many organizations, how it fits (if at all) into the topology of other data centers, the technologies used for computing and storage, and its energy efficiency. There are four main types of data centers. Enterprise data centers are built, owned, and operated by companies and are optimized for their end users. Many times they are housed on a corporate campus. Managed services data centers are managed by a third party (or a managed services provider) on behalf of a company. The company leases the equipment and infrastructure instead of buying it. In colocation ("colo") data centers, a company rents space within a data center owned by others and located off company premises. The colocation data center hosts the infrastructure: building, cooling, bandwidth, security, etc., while the company provides and manages the components, including servers, storage, and firewalls. Cloud data centers are an off-premises form of data center in which data and applications are hosted by a cloud services provider such as AMAZON WEB SERVICES (AWS), MICROSOFT (AZURE), or IBM Cloud.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

receiving, at a data center that includes a plurality of computer systems, a manifest file specifying credentials to be created and used by a first application executing in the data center to communicate with a second application executing in the data center;

creating, at the data center in response to the manifest file, a plurality of credentials for the first application;

storing, at the data center, the plurality of credentials in a credentials repository; and executing, on a production server within the data center, a production version of the first application, wherein the executing includes receiving decrypted versions of the plurality of credentials from the credentials repository, wherein the decrypted versions are accessible within the data center, but are inaccessible outside the data center.

2. The method of claim 1, wherein the manifest file is received from a software automation pipeline that automatically performs compiling and testing of the first application.

3. The method of claim 1, wherein the manifest file includes a secret specification that defines secret parameters and application metadata for a first of the plurality of credentials; and wherein the creating includes creating the first credential in accordance with the secret specification.

4. The method of claim 3, wherein the secret parameters define one or more of a type of the first credential, a length of the first credential, and a nature of characters to be used in the first credential.

5. The method of claim 3, wherein the application metadata identifies a plurality of applications associated with the first credential including the first application.

6. The method of claim 3, wherein the secret specification defines a validity time period for the first credential.

7. The method of claim 1, further comprising:

providing the created plurality of credentials to an encryption service at the data center to encrypt the plurality of credentials prior to storing the encrypted plurality of credentials in the credentials repository; and wherein the decrypted versions of the plurality of credentials are received via a decryption service at the data center.

8. The method of claim 7, further comprising:

storing, in the credentials repository, metadata obtained from the manifest file and about a first one of the plurality of credentials; and verifying, by the decryption service, the metadata about the first credential prior to providing a decrypted version of the first credential to the first application.

9. The method of claim 7, wherein the encryption and decryption services are implemented using containers.

10. The method of claim 1, further comprising:

receiving, at the data center, a credential for the first application and from a source external to the data center; and storing, at the data center, the received credential in the credentials repository.

11. A non-transitory computer readable medium having program instructions stored therein that are capable of being executed by one or more computer systems to perform operations comprising:

receiving, at a software automation pipeline within a software development environment, source code for a first application and a manifest file that specifies secrets to be created and used by the first application; and outputting, by the software automation pipeline to a data center that includes one or more production servers for the first application, a production version of the first application and the manifest file to cause the data center to create the secrets specified by the manifest file such that the secrets are accessible by the production version of the first application within the data center, but are inaccessible outside the data center.

12. The computer readable medium of claim 11, wherein the operations further comprise:

testing and compiling the source code for the first application prior to outputting the production version of the first application, wherein the software automation pipeline implements a continuous integration (CI) pipeline.

13. The computer readable medium of claim 11, wherein the outputting includes:

providing the manifest file to a secret creation service at the data center and operable to create the specified secrets and store the created secrets in a credentials repository.

14. The computer readable medium of claim 11, wherein the operations further comprise:

in response to deploying the first application to a plurality of data centers, outputting multiple instances of the manifest file to the plurality of data centers to cause each data center to create a respective set of secrets specified by the manifest file.

15. A system, comprising:

a software automation pipeline including one or more computer systems, wherein the software automation pipeline is configured to output, to a data center that includes one or more production servers, a production version of a first application and a manifest file specifying credentials to be created and used by the first application;

the data center configured to:

in response to receiving the manifest file, create a plurality of credentials for the first application; and execute, on one or more of the production servers within the data center, the production version of the first application, wherein executing the production version includes receiving decrypted versions of the plurality of credentials from a credentials repository; and a key management service (KMS) configured to implement the credentials repository that stores the created plurality of credentials.

16. The system of claim 15, wherein the manifest file defines a validity time period for one or more of the plurality of credentials; and wherein the data center is configured to comply with the validity time period for the one or more credentials.

17. The system of claim 15, wherein the manifest file includes parameters defining one or more of a credential type, a credential length, and a nature of characters to be used in one or more of the plurality of credentials; and wherein the data center is configured to create the plurality of credentials in accordance with the parameters included in the manifest file.

18. The system of claim 15, wherein the data center is configured to:

provide the created plurality of credentials to an encryption service at the data center to encrypt the plurality of credentials prior to the KMS storing the encrypted plurality of credentials in the credentials repository; and provide, to a decryption service at the data center, encrypted versions of the plurality of credentials retrieved from the KMS to produce the decrypted versions of the plurality of credentials.

19. The system of claim 18, wherein the data center is configured to implement the encryption and decryption services using containers.

20. The system of claim 15, wherein the KMS includes a hardware security module (HSM) configured to store the created plurality of credentials.

* * * * *